July 2, 1957 W. W. WAHLGREN 2,798,202

PUSH-PULL MODULATING TRANSFORMER

Filed Feb. 14, 1955 2 Sheets-Sheet 1

INVENTOR.
WALLACE W. WAHLGREN
BY
Lippincott & Smith
ATTORNEYS

July 2, 1957 W. W. WAHLGREN 2,798,202

PUSH-PULL MODULATING TRANSFORMER

Filed Feb. 14, 1955 2 Sheets-Sheet 2

INVENTOR.
WALLACE W. WAHLGREN
BY
Lippincott + Smith
ATTORNEYS

② United States Patent Office 2,798,202

Patented July 2, 1957

1

2,798,202

PUSH-PULL MODULATING TRANSFORMER

Wallace W. Wahlgren, Oakland, Calif., assignor to Electro Engineering Works, Oakland, Calif., a corporation of California Application February 14, 1955, Serial No. 487,837

7 Claims. (Cl. 332—43)

This invention relates to push-pull modulating circuits, adapted to supply modulating power to modulated radio frequency tubes. While primarily designed for use in connection with audio-frequency transmitters where the requirement is for handling relatively wide bands of audio frequencies with minimum distortion, the principles involved may be employed in other frequency ranges where the modulating power must be supplied at substantially a constant level, with minimum distortion, over fairly wide frequency bands. Because audio-frequency modulation comprises the widest field of use for the invention, however, it will be described, for convenience, as designed for this purpose, and those skilled in the art will be able to make the necessary modifications and to apply the principles involved to other analogous purposes.

In supplying modulating power to radio transmitters and the like, where high fidelity of reproduction is an important factor, and particularly where a considerable amount of power is involved, it is usual practice to use class B or class AB push-pull amplifiers in the final, audio-frequency stages. As is well understood, in such amplifiers each of the push-pull-connected tubes is operated with its grid biased substantially to cut-off. Under these circumstances each tube operates only for substantially one-half of the time, conducting current only during the halves of the audio-frequency cycles where the control grid of the tube in question swings positive. If the tubes are properly balanced such an arrangement is capable of producing audio signals with very little distortion, the even-order harmonics generated by the two tubes being in opposite phase and cancelling out providing coupling between primaries and to the load is adequate while the odd-order harmonics are produced at a relatively low level. The class B operation enables these tubes to be operated at relatively high plate efficiency, and both the amount of power required to supply the equipment and the investment in the equipment itself are reduced below that necessary in case class A modulation is employed and the tube or tubes used are so biased as to conduct current over the entire cycle of the audio-frequency input.

In installations of the character described transformer coupling between the modulating stage and the radio-frequency stage or stages is used almost universally because of its much higher efficiency as compared with other methods of coupling. In characteristic installations the frequency band which must be handled by the modulating transformer will extend from, say 40 to 50 cycles at the low-frequency end to about 5000 cycles, for broadcast purposes in the medium frequency range on which most programs are transmitted, and to materially higher frequencies for high-fidelity equipment. The broader the range to be covered by the modulating transformer the more massive it becomes. The weight and size of the equipment, and therefore its cost, increase both as the minimum frequency to be handled becomes lower and as the maximum becomes higher. High inductance is, of course, required in order to insure proper low-frequency response, but to insure good high frequency response also

2 requires heavy transformers. The reason for this is that two factors contribute to the falling off of response as frequency is increased; leakage reactance and coil capacities. Using plate modulation in the radio frequency stages, one end of the output winding of the transformer must ordinarily be effectively grounded to alternating components; the push-pull input to the transformer therefore must be converted to a single-ended output. There are therefore required in such a transformer what may be considered as at least three windings, two primaries and at least one secondary. Since each of the two primaries is active only when the tube to which it is connected is conducting, for equal transfer of power from the primaries to the secondary winding there must be equal coupling between each primary and the secondary. Furthermore, this coupling must be as close as possible. Still more important is close coupling between the two primary windings; leakage reactance between the primaries prevents cancellation of harmonics and quasi-transients developed by the cutting off of each tube in each cycle, and leads to a very unpleasant type of distortion.

In any transformer there will be a certain amount of magnetic leakage between the windings, and this results in an effective series reactance, viewed from the output terminals of the transformer, which attenuates the signals increasingly as the frequency rises. In any physically realizable transformer there are stray capacities between the windings, and from the windings to ground, which offer a return path for the signal currents which shunt the output and which divert the signal energy increasingly as the frequency increases. The effective series inductance and shunt capacities combine to form a low-pass filter which limits the high-frequency response. The effect of the stray capacities increases with the effective difference of potential applied across them, the energy thus lost increasing as the square of such potential differences.

The logical way to reduce the distributed and stray capacities is to decrease the apposed areas of the coils. This involves increasing the volts per turn by increasing the cross-sectional area of the core. The latter expedient also tends to decrease leakage reactance by offering a larger, lower reluctance path for the coupling flux. The use of large cores and relatively small windings also reduces the leakage reactance by making it possible to reduce the separation between the various portions of the windings and thus reduce the flux that threads one winding to the exclusion of others. It results, however, in a transformer which is extremely bulky in relation to the amount of power which it is required to handle. Since the core material used for such purposes is high magnetic-quality alloy, and therefore expensive, the relative differential in cost between the iron and copper is small and the resulting larger transformer, beside being expensive to manufacture and ship, occupies valuable space when installed.

The primary factor which has led to such bulky and expensive modulation transformers in the past is the necessity for extremely close and equal coupling between the two primary windings and the secondary winding or windings. The problem is complicated by the fact that in certain conformations provision must be made not only for the alternating current potentials appearing between the coils (or different portions of the same coil) but also for the direct current voltages which may be applied thereto and may require further separation between the coils, with consequent increased leakage.

Such insulation may, it is true, decrease the capacity between the windings so insulated, but since the frequency at which the response curve begins to droop is a function of the product of the leakage inductance and the distributed capacity the result will, in general, be to reduce the range over which uniform response can be obtained.

The broad purpose of the present invention is to provide a construction for push-pull modulation transformers which minimizes the limiting factors above discussed and thus permits the design of transformers which, as compared with conventional types, will give equal performance at a fraction of the weight and the expense, greatly improved performance for the same weight, or any intermediate compromise between these two effects.

Contributory to this broad purpose, among the objects of the invention are to provide a modulating circuit wherein no more than two windings need be closely magnetically coupled; to provide a modulating circuit wherein maximum coupling is obtained between the magnetically coupled windings; to provide a modulating transformer having minimum distributed and stray capacities between the windings, together with maximum coupling between such windings, and to provide a modulating circuit wherein, on a single core, a combination of magnetic and electrical coupling between coils is employed in such manner that the normalized leakage reactance between either input circuit and the output circuit is only of the order of one- or two-hundredths of one percent.

The circuit of the present invention comprises two electrically equivalent primary windings, connected in series, which are disposed on separate ferromagnetic core members, each of which forms a portion of a closed magnetic circuit. The magnetic circuits threading the two primaries may be entirely separate. Preferably, however, the members which bear the windings are joined by ferromagnetic yokes so that the magnetic circuit of each winding is completed through the other.

A one-to-one ratio secondary winding is so wound as to be closely coupled to the first primary winding. In order to secure the closest possible coupling between the first primary and the secondary winding the two are preferably interleaved in such manner that they occupy, as nearly as is possible with separate windings, the same space. Since, as will be described, one end of the secondary winding is connected to the primary winding, so that double the primary voltage appears across the unconnected terminals, the windings are preferably so arranged that the potential gradients between the apposed portions thereof are in the same direction, so that the voltages between adjacent sections do not exceed that appearing across a single one of the two windings.

The second primary winding is coupled to an output winding. If, as is sometimes convenient, an entirely separate output winding is used, it is preferably interleaved with the second primary winding in the same general manner as is the secondary winding with the first primary. Alternatively, where an autotransformer output connection is satisfactory, the second primary becomes a portion of the output winding and the remainder thereof is superimposed upon the second primary winding.

The two primary windings are connected in series, and their terminals are connected, respectively, to the anodes of the push-pull connected modulating tubes, the junction between them connecting to the usual anode voltage source. The secondary winding is connected in parallel with the second primary winding.

The reasons for the amove arrangement described and the advantages derived therefrom will be more apparent from the detailed description of a preferred embodiment which follows, taken in conjunction with the accompanying drawings wherein.

Figure 3:
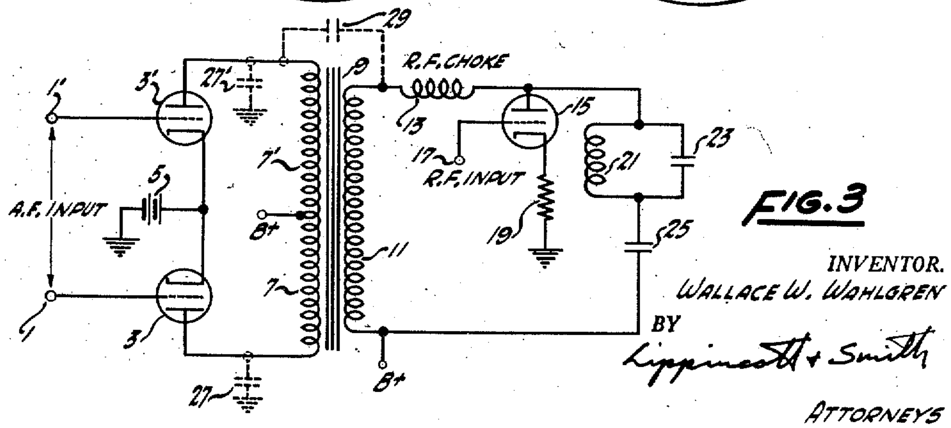
Fig. 3 is a schematic diagram of a conventional modulating circuit, indicating, schematically, certain of the effective capacities which limit its frequency response.

In order that the problems involved in the design of modulation transformers may be clearly understood and the advantages of the construction here to be described appreciated, there is shown, in Fig. 3, a simplified circuit diagram of one conventional form of circuit. In this diagram only the modulating audio-frequency stage and the modulated radio-frequency stage are illustrated, it being understood that in most cases, particularly where high power is employed, there will be preliminary amplifiers delivering the various frequencies to the stages shown.

The audio-frequency signals from such preliminary stages are delivered to terminals 1 and 1', connecting with the grids of push-pull connected amplifiers 3 and 3' respectively. For simplicity these tubes are shown as triodes, although they may, of course, be pentodes or other conventional amplifying equipment. The cathodes of these tubes are connected together and to ground. A source 5 of biasing potential is shown interposed in the ground lead to symbolize the fixed bias normally employed in class B modulators. The anodes of the two tubes connect to opposite ends of a center-tapped primary winding, the two halves of which are designated as 7 and 7' respectively. Anode voltage is supplied to the tubes from a source, which is not shown, through the center tap labeled B+. The coils are disposed on a ferromagnetic core 9, and this core also carries an output or secondary winding 11.

One end of the secondary winding 11 connects to a source of anode current B+ which may be the same as that supplying the primary winding or may be separate. So far as the alternating component is concerned this end of the winding may be considered as being at ground potential. The other end of the winding connects through a radio-frequency choke 13 with the anode of a radio-frequency amplifier (or oscillator) 15, and the radio frequency which is to be modulated is applied to the grid of this tube through input terminal 17. Tube 15 is also shown as self-biased through a cathode resistor 19. The anode of tube 15 connects to a tuned radio-frequency circuit comprising an inductor 21 in parallel with a capacitor 23, the parallel resonant circuit thus formed being connected in series with a condenser 25 to B+. The condenser 25 is of low impedance to the audio frequencies.

It is to be understood that so far as the radio-frequency circuits shown in this diagram are concerned, the circuit is merely illustrative. From the point of view of the modulating transformer this circuit is merely a load which is primarily resistive, and it is therefore illustrated as a simple resistance in the other circuit diagrams which will be explained hereinafter. The modulating requirements are the same irrespective of whether the radio-frequency side of the circuit employs the Heising plate-modulation which has been illustrated or any one of the many other modulators, which require the delivery of modulating power at a relatively high level.

Moreover, where material power is to be modulated, it is usual practice to interpose a blocking condenser in the secondary circuit and to feed plate-voltage to the radio-frequency tube through a shunt reactor, to avoid saturating the modulating transformer by direct current components. Since this is a conventional practice, which can be employed or not with the present invention, as desired, the additional components required are omitted for simplicity.

Reverting to the transformer carrying coils 7, 7' and 11, various manufacturers have disposed these coils upon the wound legs in various ways, sometimes interleaving the windings to attain the desired close and uniform coupling.

To secure the very close coupling which is particularly necessary between the coils 7 and 7' is difficult. The windings are customarily distributed over 1 or 2 legs of a closed magnetic core. Because the primary circuit is push-pull and the secondary is single ended, a completely symmetrical arrangement is impossible. Measured from B+, or A. C. ground, the voltage developed in the secondary is in the same sense as that developed in one primary, the voltage difference between adjacent parts of the two coils is small and little or no insulation is necessary between them. The voltage developed on the other primary, however, is in the opposite phase and primary and secondary voltages add, instead of subtract, in adjacent portions of the coils, requiring fairly heavy insulation which occupies space, causes separation of the coils, hence results in leakage reactance. The closer the coupling between the primary windings the looser it is between the primaries and the secondary, and the greater is the unbalance between the couplings of the two primaries with the secondary.

The problem of stray capacities existing between windings, between the windings and the core, and the distributed capacities between turns of the same winding also complicate the matter. Capacity between two points which share the same alternating potential is without effect. Capacities between the turns of the same coil cannot be avoided, but since voltage between turns is relatively low these distributed capacities are comparatively unimportant as compared with those between windings and from the windings to the core or ground. The more important of these capacities are symbolized by condensers 27, 27' and 29. Usually the largest of these will be capacity 27, which includes that of the coil 7 to the core, and to the winding 11 if it be interleaved therewith. Capacity 27' also has full primary voltage effective between the free terminal of coil 7' and the core or ground. As the coil 11 will usually develop about 1½ times the voltage across either primary, the effect of the capacity 29, if the winding 11 is interleaved with winding 7', is only about one-half of that between primary 7 and the grounded end of coil 11.

If unity coupling could be achieved between all three coils, the capacity in one part of the circuit would be reflected into each of the others and these discrepancies would make no difference. Since unity coupling cannot be achieved with this arrangement the differences in capacity add to and aggravate the unbalance. The effect of each is to bypass the energy of the higher frequencies to an extent which is proportional to the square of the alternating voltage across them, and, in series with the leakage inductance of the device, to form a filter network which determines high-frequency cut-off of the modulator.

Figure 1:
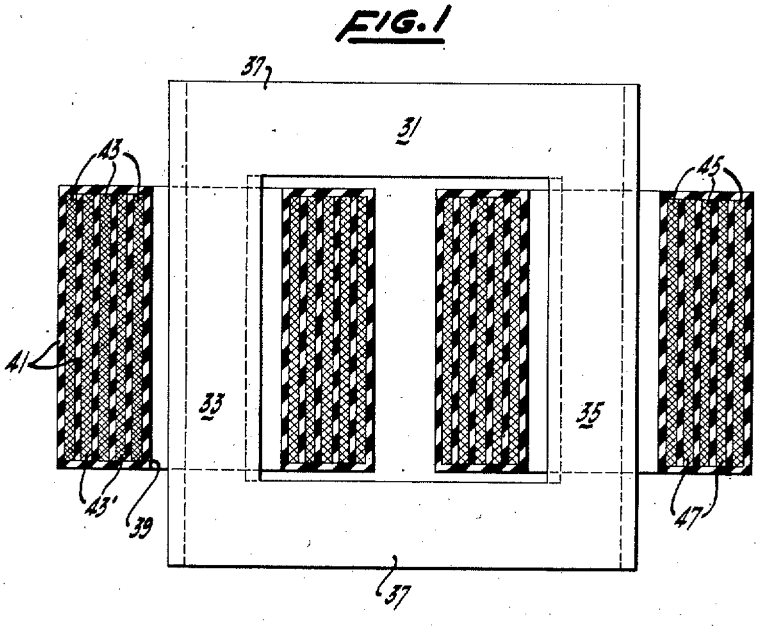
Fig. 1 is a vertical sectional view through a transformer embodying the present invention.
Figure 2:
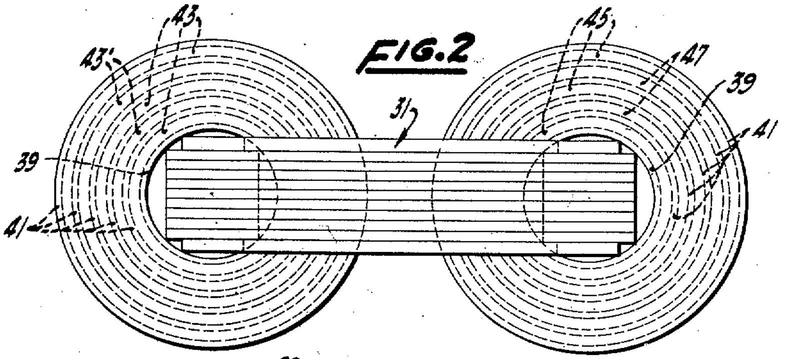
Fig. 2 is a plan view of the transformer of Fig. 1, the plane of section of the first figure being indicated by the lines 1—1 in Fig. 2.
Figure 4:
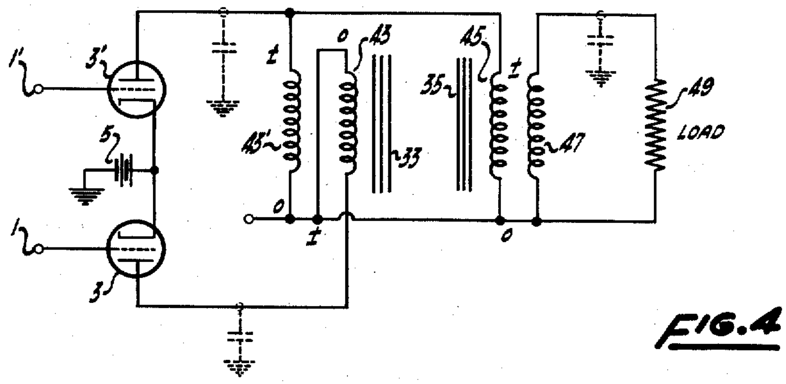
Fig. 4 is a schematic diagram of a modulating circuit in accordance with the instant invention, as employed with separate windings as the secondary and output coils.

With these considerations in mind the present invention will next be considered. Figs. 1 and 2 illustrate the structure of a preferred embodiment, while Fig. 4 is a schematic diagram thereof, showing the connections of the transformer itself and those to the output circuit.

In the particular transformer illustrated a conventional rectangular core 31 is employed, comprising two legs 33 and 35 upon which the windings are to be disposed, joined by yokes 37 which, with the legs, form a closed magnetic circuit.

The transformer chosen for illustration employs a separate output winding. In this case each of the legs 33 and 35 carries two mutually insulated sets of windings, each insulated from the core by layers of insulation 39. The two windings on the leg 33 are made as nearly electrically identical and are as closely coupled as possible. To this end each winding is divided into sections which are separated by further layers of insulation 41. The insulation may be impregnated paper, cloth, or sheet plastic, in accordance with conventional practice.

The coils on the leg 33 comprise a primary winding 43 and a secondary winding 43', each having the same number of turns. These windings are connected in series, so that twice the voltage developed in the primary appears between the free primary and secondary terminals. They are so interconnected and interleaved as to give maximum coupling between them and at the same time, to minimize interwinding capacity. Maximum coupling would be achieved by a bifilar winding, but this would involve maximum interwinding capacity, since the full voltage of one winding would be effective between each pair of wires throughout the length of the coils. Moreover, the necessity of insulating against the full primary voltage between each turn would lead to a very bulky structure. Experience has shown that in general the most satisfactory compromise is obtained by dividing one winding into three sections and the other winding into two, each of which has 50 percent more turns than the individual sections of the first winding. Those skilled in the art will realize that since the primary and secondary are nearly as possible electrically identical it actually makes no difference, until the windings are connected, which is considered the primary and which the secondary.

Leg 35 also carries two windings which are preferably interleaved in the same manner as the windings in leg 33. Winding 45 is a secondary primary winding, and is made as nearly electrically identical as possible to the primary winding 43. The output winding 47 is designed to meet the requirements of the tube which the device is intended to modulate. Usually it will be required to supply an alternating voltage which is 40 or 50 percent greater than that developed in any one of the other coils which have been described and will therefore be wound with somewhat finer wire and with 40 to 50 percent more turns.

The connections between the windings into the external circuit are illustrated in Fig. 4. In this figure the input amplifier is considered as being identical with that of Fig. 3 and the parts are therefore designated by the same reference characters. The primary winding 43 is connected from the anode of tube 3 to B+. The second primary winding 45 connects from the plate of tube 3' to B+. The secondary winding 43' is shunted across between the plate of the tube 3' and B+, the connections being such that if legs 33 and 35 are included in the same magnetic circuit, and the transformer is excited from the primary 43 only, the potentials developed at the connected terminals of coils 43 and 43' are the same and no circulating current will flow through these two windings.

Figure 6:
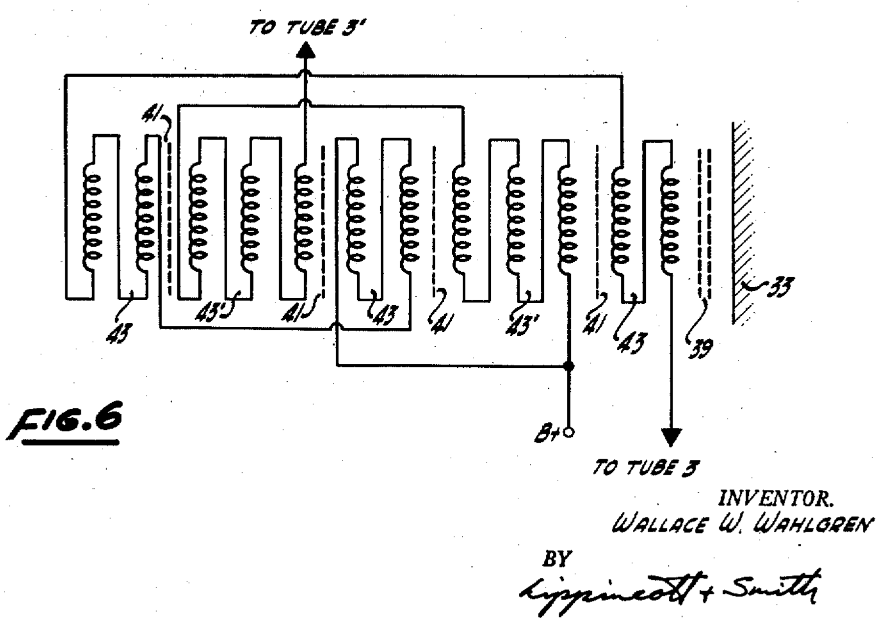
Fig. 6 is a diagrammatic representation of the connections of an interleaved winding combining maximum coupling with minimum effective distributed capacity and insulation.

The preferred manner of interleaving windings 43 and 43' is indicated in Fig. 6, wherein each coil indicates a layer of winding. The bottom of each layer is connected to the top of the next, within each section, and the sections are so interconnected that the current flow through all layers is in the same direction. The voltage between adjacent layers of the same section is then that developed across one layer only, instead of two, as would be the case if one layer were wound back over the other, and the maximum voltage difference between adjacent sections is that of a single complete winding. This results in minimum and most uniformly distributed insulation and therefore in most closely and uniformly coupled coils. Insulation between adjacent sections and between sections and core is indicated by the dotted lines.

Coils 45 and 47 are interleaved in the same general manner, but since the voltages between them are in the same sense the inter-section insulation is less. Since all windings are interconnected no insulation need be provided against D. C. voltages, except to the core.

The connections thus described are not an essential feature of this invention. They are illustrated and described, however, as a preferred manner of obtaining the closest coupling between the inductively coupled windings.

Considering the operation of the devices thus connected it is to be remembered each of the tubes 3 and 3' conducts during one-half of the cycle only, when operated class B. The current flow in the two halves of the cycle is quite different. Considering first the half of the cycle in which tube 3' is conducting, primary 43 is connected across an open circuit and can carry no current. Current from tube 3' therefore flows almost entirely through primary 45, which is closely coupled to coil 47, the latter coil supplying energy to load 49, indicated as a resistor. Coil 43' acts as a very high reactance shunted across primary 45, for since there is no counter magneto-motive force developed by any current flowing in coil 43, coil 43' need carry no load current whatsoever. It merely supplies a portion of the magnetizing component current which excites the magnetic circuit as a whole. During this half of the cycle the only difference that would be made by disconnecting coil 43' would be that coil 45 would have to carry twice the magnetizing component, which is negligible in comparison to the load current.

When tube 3' ceases and tube 3 starts to conduct the situation suddenly changes. Current is no longer supplied to primary 45 from the tube but instead the load into this winding is assumed by secondary winding 43' and the device becomes, in effect, two transformers connected in cascade. As was indicated above, legs 33 and 35 could be on entirely separate magnetic circuits, since flux in the core is not required to couple windings 43 and 45, the coupling being purely electrical. If the winding 43' were now disconnected the leakage reactance of the system would rise sharply, but it would still continue to operate as a transformer.

Coils 43 and 43' carry current only during the active half of each cycle, whereas coil 45 carries a full load at all times. An additional resistance loss is therefore introduced into the circuit during the half cycle through which tube 3 is active, but the resistance loss thus introduced can be made so small in comparison with the load resistance that it too may be neglected.

Figure 5:
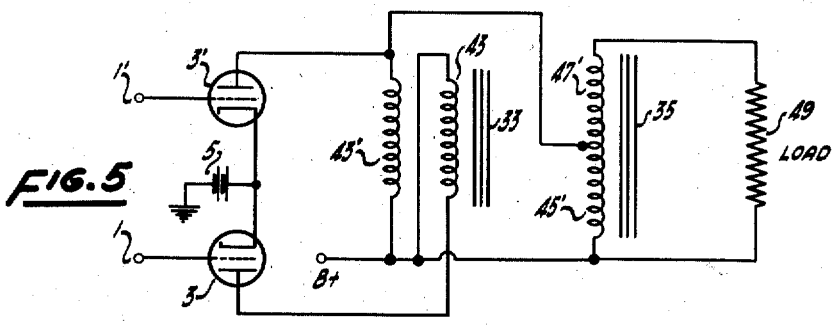
Fig. 5 is a diagram similar to Fig. 4, wherein the secondary and output windings are combined through the use of an auto-transformer connection.

Substitution of the direct coupling between the two primaries for the magnetic coupling usually employed, might appear at first sight to be substitution of equivalents, the advantages of which would be counterbalanced by the asymmetry due to the difference in operation in the two halves of the cycle. The contrary, however, is shown by a practical example. Comparing two modulating transformers meeting the same specifications as to frequency band, distortion, and transient response, and each having a one kilowatt rating, the one embodying the present invention weighs 45 lb. as compared with 165 lbs. for the conventional type. The effective primary inductance of the transformer embodying this invention is 80 henrys. The leakage inductance between primary 43 and the output winding 47 is 18 millihenrys and that between primary 45 and the output windings is 9 millihenrys, all measurements being made at 60 cycles. The coefficient of coupling between primary 43 and the output circuit is therefore in excess of 0.999, while that between primary 45 and the output circuit is still higher.

Where the plate supply is well filtered, the modification illustrated in Fig. 5 may be used. The windings on the leg 33 may then be identical with those in the form of the invention shown in Fig. 4. The primary coil 45' has the same number of turns as the individual coils on leg 33, and is connected in the same manner. The output circuit includes this coil plus additional turns comprising the portion of the winding designated as 47'; usually the number of additional turns required will amount to 40 to 50 percent of the number in the coil 45'. Because the primary and secondary currents flow in opposite directions, the secondary current subtracting from that in the primary, smaller wire can be used in both windings. Furthermore, no insulation is required in addition to that between layers. This leads to a very compact winding and renders unnecessary interleaving of sections to obtain close coupling. This modification of the invention leads to a more economical design than does that of Fig. 4, but it is not as efficacious in filtering out ripple from an insufficiently filtered plate supply to the tubes 3, 3'. For this reason a separate output winding may be preferred, even though more expensive, since the additional cost of the separate windings may be more than absorbed through the use of a less expensive filter.

As has already been pointed out, since magnetic coupling is not relied upon to transfer energy from primary 43 to primary 45 and thence to the output winding, the windings on the two legs may be disposed on completely separated magnetic circuits. Such an arrangement is obviously not as economical of core material, however, and will in general require that the tubes supply a somewhat greater magnetizing current. Disposing the windings on a single core is therefore ordinarily to be preferred, although a separate core construction might be resorted to for special purposes, as, for example, for a transmitter to be fitted into a very restricted space of unusual proportions. Various possible modifications of the basic principles here disclosed will be evident to those skilled in the art. The particular embodiments described are therefore not to be considered the scope of the invention, all intended limitations being expressed in the following claims:

1. A push-pull modulating circuit comprising a first magnetic core member, a first primary winding and a closely coupled and electrically equivalent secondary winding disposed on said core member, a second magnetic core member, a second primary winding electrically equivalent to said first primary winding and connected in series therewith disposed on said second core member, an output circuit closely coupled with said second primary winding, means for completing the magnetic circuits of each of said core members, connections for exciting said first primary winding from one of a pair of push-pull connected amplifying elements, and connections for exciting said second primary winding from the other of said pair of amplifying elements and from said secondary winding in parallel.

2. A modulating circuit as defined in claim 1 wherein said output circuit comprises said secondary winding and additional winding turns connected in series therewith to form a step-up auto-transformer.

3. A modulating circuit as defined in claim 1 wherein said output circuit comprises a separate winding interwound with said second primary winding.

4. A modulating circuit as defined in claim 1 wherein said means for completing the magnetic circuits of each of said core members comprise magnetic yokes connecting the ends thereof to complete the magnetic circuit of each through the other.

5. A push-pull modulation transformer comprising a closed ferromagnetic core having two legs adapted to carry windings thereon, a pair of electrically equivalent primary windings connected in series and disposed respectively on the two legs of said core, a secondary winding closely coupled with one of said primary windings and electrically equivalent thereto connected to supply the other of said primary windings, leads for connecting an amplifier element to supply said other primary winding in parallel with its supply from said secondary winding, leads for supplying said one primary winding from a second amplifying element, and an output circuit including a winding disposed on the same leg of said core as said second primary winding and closely coupled therewith.

6. A modulation transformer as defined in claim 5 wherein said one primary winding and said secondary winding comprise mutually interleaved sections.

7. A push-pull transformer comprising a closed ferromagnetic core having two legs adapted to carry windings thereon, a pair of electrically equivalent primary windings connected in series and disposed respectively on the two legs of said core, a secondary winding closely coupled with a first one of said primary windings, and disposed on the same leg of said core, electrical connections from the terminals of said secondary winding to the terminals of the second of said primary windings, leads also connecting to the terminals of said second primary winding for connection to an amplifying device, leads connecting to the terminals of said first primary winding for connection to another amplifying device, and an output winding closely coupled to said second primary winding and disposed therewith on the same leg of said core.

References Cited in the file of this patent

UNITED STATES PATENTS

| | | |
|---|---|---|
| 1,715,542 | Elmen | June 4, 1929 |
| 2,477,074 | McIntosh | July 26, 1949 |

UNITED STATES PATENT OFFICE

CERTIFICATE OF CORRECTION

Patent No. 2,798,202 July 2, 1957

Wallace W. Wahlgren

It is hereby certified that error appears in the printed specification of the above numbered patent requiring correction and that the said Letters Patent should read as corrected below.

Column 3, line 62, for "amove" read -- above --; column 4, line 54, after "impedance" insert -- to the radio-frequency components of the signal but of high impedance --.

Signed and sealed this 27th day of August 1957.

(SEAL)
Attest:

KARL H. AXLINE
Attesting Officer

ROBERT C. WATSON
Commissioner of Patents